United States Patent
Kelleher et al.

(10) Patent No.: US 11,149,681 B2
(45) Date of Patent: Oct. 19, 2021

(54) PISTON WITH INSULATING AIR GAP FORMED BY ADDITIVE MANUFACTURING

(71) Applicant: Cummins Inc., Columbus, IN (US)

(72) Inventors: Jordan E. Kelleher, Columbus, IN (US); Lyle E. Kocher, Whiteland, IN (US); Dwight A. Doig, Columbus, IN (US); Brett A. Boas, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/962,346

(22) PCT Filed: Nov. 28, 2018

(86) PCT No.: PCT/US2018/062735
§ 371 (c)(1),
(2) Date: Jul. 15, 2020

(87) PCT Pub. No.: WO2019/143403
PCT Pub. Date: Jul. 25, 2019

(65) Prior Publication Data
US 2020/0340424 A1    Oct. 29, 2020

Related U.S. Application Data

(60) Provisional application No. 62/619,252, filed on Jan. 19, 2018.

(51) Int. Cl.
*F02F 3/16*       (2006.01)
*B33Y 10/00*    (2015.01)
(Continued)

(52) U.S. Cl.
CPC ............ *F02F 3/16* (2013.01); *B22F 5/008* (2013.01); *B22F 10/20* (2021.01); *B33Y 10/00* (2014.12); *B33Y 40/20* (2020.01); *B33Y 80/00* (2014.12)

(58) Field of Classification Search
CPC .. F02F 3/16; B22F 10/00; B22F 5/008; B22F 2998/10; B22F 7/062; B22F 7/06;
(Continued)

(56) References Cited

U.S. PATENT DOCUMENTS 7,654,240 B2    2/2010    Jarrett et al.
9,127,616 B2    9/2015    Weinenger et al.
(Continued)

OTHER PUBLICATIONS

International Preliminary Report on Patentability received for PCT Patent Application No. PCT/US2018/062735, dated May 1, 2020, 24 pages.
(Continued)

*Primary Examiner* — Joseph J Dallo
*Assistant Examiner* — Yi-Kai Wang
(74) *Attorney, Agent, or Firm* — Faegre Drinker Biddle & Reath LLP

(57) ABSTRACT

The present disclosure provides a piston, comprising: a skirt having an upper body portion; and a crown formed on the upper body portion by an additive manufacturing process, the crown including at least one air gap formed and positioned to reduce heat transfer from combustion to at least one cooling gallery formed in the piston.

19 Claims, 3 Drawing Sheets

(51) Int. Cl.
　　　*B33Y 80/00*　　　(2015.01)
　　　*B33Y 40/20*　　　(2020.01)
　　　*B22F 5/00*　　　(2006.01)
　　　*B22F 10/20*　　　(2021.01)

(58) Field of Classification Search
　　　CPC ........ B22F 7/08; B22F 2999/00; B33Y 10/00;
　　　　　　　　　B33Y 80/00; B33Y 40/20; Y02P 10/25
　　　USPC ..................................................... 123/193.6
　　　See application file for complete search history.

(56) References Cited

U.S. PATENT DOCUMENTS

| | | | |
|---|---|---|---|
| 9,687,942 B2 | 6/2017 | Flowers | |
| 9,765,727 B2 | 9/2017 | Evers et al. | |
| 2008/0041333 A1* | 2/2008 | Jarrett | F02F 3/0023 |
| | | | 123/254 |
| 2014/0299091 A1 | 10/2014 | Ribeiro et al. | |
| 2016/0138516 A1* | 5/2016 | Moding | C23C 16/406 |
| | | | 92/248 |
| 2016/0281635 A1 | 9/2016 | Weinenger et al. | |
| 2017/0363040 A1* | 12/2017 | Brown | F16J 1/001 |

OTHER PUBLICATIONS

International Search Report and Written Opinion received for PCT Patent Application No. PCT/JP2015/083238, dated Feb. 8, 2019, 07 pages.
International Search Report and Written Opinion issued by the ISA/US, Commissioner for Patents, dated Feb. 8, 2019, for International Application No. PCT/US2018/062735; 7 pages.

* cited by examiner

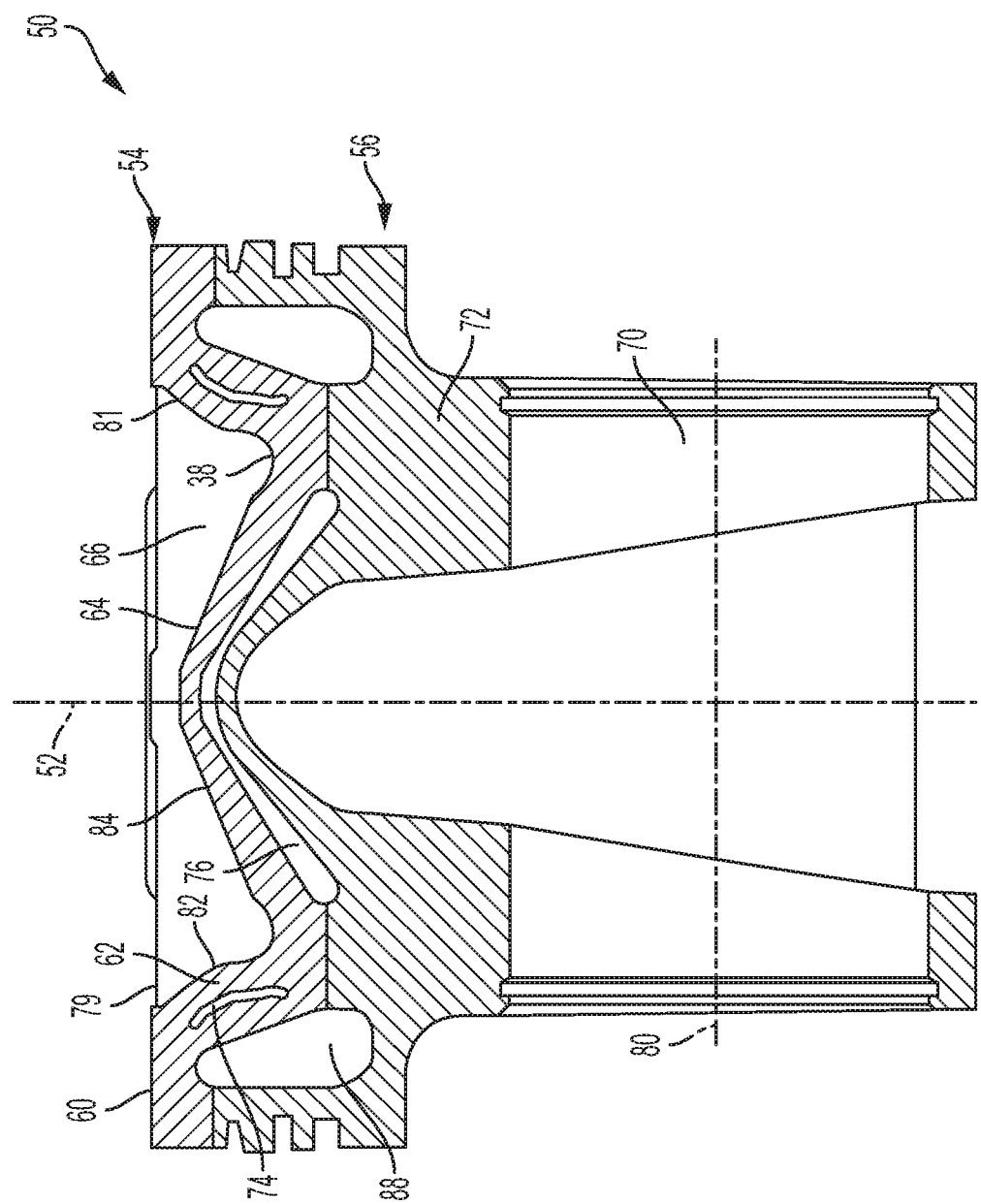

PISTON WITH INSULATING AIR GAP FORMED BY ADDITIVE MANUFACTURING

CROSS-REFERENCE TO RELATED APPLICATIONS

This application is a national phase filing of International Application No. PCT/US2018/062735, filed Nov. 28, 2018, which claims priority to U.S. Provisional Application No. 62/619,252, filed Jan. 19, 2018, the disclosures of which being hereby expressly incorporated herein by reference.

GOVERNMENT SUPPORT CLAUSE

The invention was made with government support under contract DE-EE0007281 awarded by DOE. The government has certain rights in this invention.

FIELD OF THE DISCLOSURE

The present disclosure generally relates to internal combustion engine piston design, and more particularly to a piston design having insulating air gaps formed by additive manufacturing.

BACKGROUND

A significant portion of the fuel energy used in an internal combustion engine is lost as heat transferred from the combustion chamber to the coolant (e.g., oil). Thus, a reduction in this heat loss through the pistons results in an improvement to the engine's efficiency. It is known that a reduction in the heat transfer through the piston often results in an increase in exhaust temperatures, which can be beneficial for the turbine, after-treatment system and waste heat recovery system.

One approach to reduce heat loss through pistons is to include air gaps (or pockets) below the crown of the pistons to provide a layer of insulation between the high temperatures at the crown and the piston cooling gallery. While such air gaps may be created by welding an upper portion of the piston to a lower portion of the piston, a relatively large height piston is needed to facilitate the welding process. The engine industry, however, is moving toward smaller compression height pistons because they result in reduced friction and more compact engine packaging. As such, piston manufacturers face a difficult challenge in providing short compression height pistons with air gaps formed using conventional manufacturing processes.

It is also known that decreases in heat transfer through the piston result in temperature increases at the piston crown. If the crown temperatures exceed the oxidation limit of the piston materials, piston failure may result. Thus, an improved approach is needed for providing short compression height pistons with air gaps for reduced heat transfer through the pistons and an anti-oxidation protective coating on the crown surface.

SUMMARY

According to one embodiment, the present disclosure provides a piston, comprising: a skirt having an upper body portion; and a crown formed on the upper body portion by an additive manufacturing process, the crown including at least one air gap. In one aspect of this embodiment, the at least one air gap is formed and positioned to reduce heat transfer from combustion to at least one cooling gallery formed in the piston. In a variant of this aspect, the cooling gallery is formed between the crown and the skirt adjacent a perimeter of the piston. In another aspect, the additive manufacturing process includes laser metal deposition. In yet another aspect, the at least one air gap includes an outer peripheral air gap and a central air gap. In a variant of this aspect, the crown includes an upper surface, a bowl rim, an outer wall and a central wall, the outer peripheral air gap being formed between an inner surface of the outer wall and the upper body portion of the skirt, and the central air gap being formed between the central wall and the upper body portion of the skirt. Another variant further comprises an anti-oxidation coating applied to at least one of the upper surface of the crown, the bowl rim, the inner surface of the outer wall, and the upper surface of the central wall. In a further variant, the anti-oxidation coating includes at least one of an aluminum chrome oxide coating or a chrome oxynitride coating. In still a further variant, the anti-oxidation coating has a thickness of less than 50 micrometers. In another variant of this aspect, the anti-oxidation coating has a thickness of between 5 micrometers and 10 micrometers.

In another embodiment, the present disclosure provides a method of forming a piston, comprising: providing a skirt having an upper body portion; and forming a crown on the upper body portion by an additive manufacturing process, the crown including at least one air gap formed and positioned to reduce heat transfer from combustion to at least one cooling gallery formed in the piston. In one aspect of this embodiment, forming a crown on the upper body portion by an additive manufacturing process includes using a laser metal deposition process. In another aspect, the cooling gallery is formed between the crown and the skirt adjacent a perimeter of the piston. In another aspect, the at least one air gap includes an outer peripheral air gap and a central air gap. In a variant of this aspect, forming a crown on the upper body portion by an additive manufacturing process includes forming an upper surface of the crown, a bowl rim of the crown, an outer wall of the crown and a central wall of the crown, the outer peripheral air gap being formed between an inner surface of the outer wall and the upper body portion of the skirt, and the central air gap being formed between the central wall and the upper body portion of the skirt. Another variant further comprises applying an anti-oxidation coating to at least one of the upper surface of the crown, the bowl rim, the inner surface of the outer wall, and the upper surface of the central wall. In a further variant, the anti-oxidation coating includes at least one of an aluminum chrome oxide coating or a chrome oxynitride coating. In yet another variant, the anti-oxidation coating has a thickness of less than 50 micrometers.

In yet another embodiment, the present disclosure provides a piston prepared by a process, comprising: providing a skirt having an upper body portion; and forming a crown on the upper body portion by an additive manufacturing process, the crown including at least one air gap. In one aspect of this embodiment, the crown is formed and positioned to reduce heat transfer from combustion to at least one cooling gallery formed in the piston. In another aspect, the at least one air gap includes an outer peripheral air gap and a central air gap. In yet another aspect, forming a crown on the upper body portion by an additive manufacturing process includes forming an upper surface of the crown, a bowl rim of the crown, an outer wall of the crown and a central wall of the crown, the outer peripheral air gap being formed between an inner surface of the outer wall and the upper body portion of the skirt, and the central air gap being formed between the central wall and the upper body portion of the skirt.

In yet another embodiment, the present disclosure provides a piston, comprising: a skirt having an upper body portion; and a crown disposed on the upper body portion; wherein the skirt and the crown are formed by an additive manufacturing process, the crown including at least one air gap. In one aspect of this embodiment, the crown is formed and positioned to reduce heat transfer from combustion to at least one cooling gallery formed in the piston.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein;

FIG. 3 is a cross-sectional view of a piston according to the present disclosure.

Figure 1:
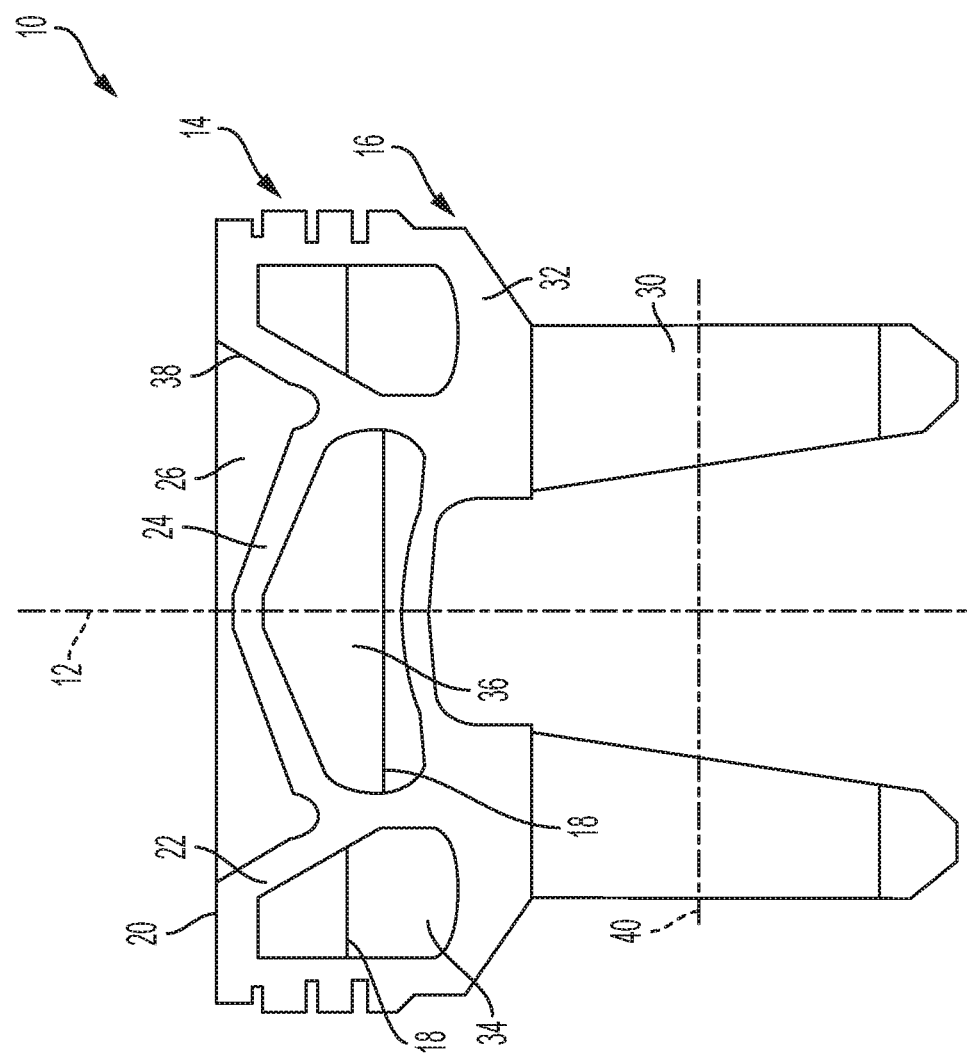
FIG. 1 is a cross-sectional view of a prior art piston.

Although the drawings represent embodiments of the various features and components according to the present disclosure, the drawings are not necessarily to scale and certain features may be exaggerated in order to better illustrate and explain the present disclosure. The exemplification set out herein illustrates embodiments of the disclosure, and such exemplifications are not to be construed as limiting the scope of the disclosure in any manner.

DETAILED DESCRIPTION OF EMBODIMENTS OF THE DISCLOSURE

For the purpose of promoting an understanding of the principles of the disclosure, reference will now be made to the embodiments illustrated in the drawings, which are described below. It will nevertheless be understood that no limitation of the scope of the disclosure is thereby intended. The disclosure includes any alterations and further modifications in the illustrated device and described methods and further applications of the principles of the disclosure, which would normally occur to one skilled in the art to which the disclosure relates. Moreover, the embodiments were selected for description to enable one of ordinary skill in the art to practice the disclosure.

As described below, in various embodiments the present disclosure provides a piston manufacturing technique which permits fabrication of short compression height pistons (and other pistons) with insulating air gaps. The air gaps are formed using additive manufacturing ("AM") techniques such as laser metal deposition. Use of AM for air gap formation in the manner described herein provides great design flexibility for the air gaps. For example, the air gaps can be more heavily biased towards the exhaust side of the piston (i.e., the gaps may be asymmetric relative to the center axis of the piston). Additionally, the air gaps may be precisely located only where the fuel plumes impinge on the piston bowl rim. Moreover, the air gaps may be formed in complicated shapes that provide advantages from a thermal and/or structural perspective. Finally, through use of AM the material deposited to form the air gaps can be selected to provide improved oxidation, fatigue or other properties.

Referring now to FIG. 1, a prior art piston is shown. Piston 10 is a generally cylindrical structure having a longitudinal axis 12. In general, piston 10 includes a crown 14 and a skirt 16. In this example, crown 14 is welded such as by friction welding at weld lines 18 to skirt 16. Crown 14 includes an upper surface 20, an outer wall 22 and a central wall 24. Outer wall 22 and central wall 24 together form a piston bowl 26. A fuel injector (not shown) provides controlled injections of fuel into piston bowl 26 during engine operation which, in a compression-ignition engine, results in combustion when piston 10 is near the top-dead-center ("TDC") position.

Skirt 16 includes a central opening 30 configured to receive a wrist pin (not shown) for connecting piston 10 to a connecting rod (not shown). Skirt 16 also includes an upper body portion 32 which is welded to crown 14 at weld lines 18. As shown, crown 14 and upper body portion 32 of skirt 16 are formed such that when connected together at weld lines 18, an outer peripheral air gap 34 and a central air gap 36 are formed. In a typical manufacturing process, crown 14 and skirt 16 are forged, then joined by friction welding.

Figure 2:
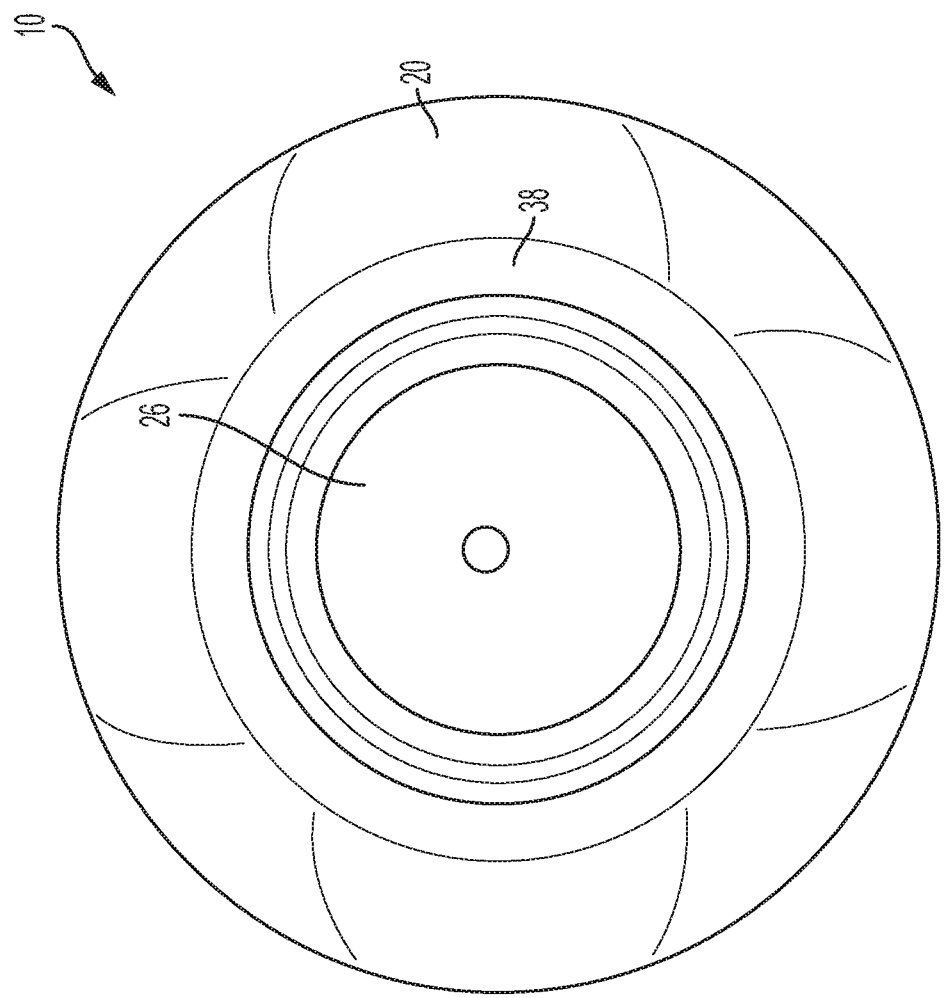
FIG. 2 is a top view of a prior art piston showing oxidation.

Piston 10 provides reduced heat transfer through piston 10, but as shown, the compression height (i.e., the distance between upper surface 20 and a centerline 40 of central opening 30) is relatively large. Moreover, the insulation provided by air gaps 34, 36 results in very high temperatures in piston bowl 26. As shown in FIG. 2, this high temperature may result in oxidation in piston bowl 26, in particular in the bowl rim 38.

Referring now to FIG. 3, a cross-section of a piston 50 made according to the principles of the present disclosure is shown. Like piston 10, piston 50 is a generally cylindrical structure having a longitudinal axis 52. In general, piston 50 includes a crown 54 and a skirt 56. In this example, crown 54 is formed onto skirt 56 using an AM process as described herein. In an alternative embodiment, crown 54 and skirt 56 (i.e., the entire piston 50) is formed using an AM process as described herein. The AM processes contemplated by this disclosure include laser metal deposition and all of its variations and any other suitable AM method. It is also contemplated that direct energy deposition technology (e.g., plasma spray) and/or electron beam technology may be used. Crown 54 includes an upper surface 60, a bowl rim 79, an outer wall 62 and a central wall 64. Outer wall 62 and central wall 64 together form a piston bowl 66. A fuel injector (not shown) provides controlled injections of fuel into piston bowl 66 during engine operation which, in a compression-ignition engine, results in combustion when piston 50 is near the top-dead-center ("TDC") position.

Skirt 56, which may be a forged component of piston 50, includes a central opening 70 configured to receive a wrist pin (not shown) for connecting piston 50 to a connecting rod (not shown). Skirt 56 also includes an upper body portion 72 on which crown 54 is formed using AM. As shown, crown 54 is formed on upper body portion 72 of skirt 56 such that an outer peripheral air gap 74 and a central air gap 76 are formed. These air gaps 74, 76 inhibit heat transfer to cooling gallery 88 formed around crown 54, and thereby provide the benefits described above regarding lower heat transfer through piston 50 and higher combustion temperatures.

Piston 50 provides reduced heat transfer through piston 50, and also enables a reduced compression height (i.e., the distance between upper surface 60 and a centerline 80 of central opening 70). In one embodiment, the compression height reduction is approximately 3.5% of the bore size. Moreover, the insulation provided by air gaps 74, 76 may be designed through formation of crown 54 with great flexibility. The higher temperatures in piston bowl 66 resulting from air gaps 74, 76 may be accommodated by providing an anti-oxidation coating as described herein.

Still referring to FIG. 3, an anti-oxidation coating 81 may be applied to upper surface 60 of crown 54, bowl rim 79, an inner surface 82 of outer wall 62 and an upper surface 84 of central wall 64. A variety of different anti-oxidation coatings 81 may be used, including coatings comprising aluminum chrome oxide or chrome oxynitride. The thickness of coating 81 may be less than approximately 50 micrometers, and in some embodiments between 5 and 10 micrometers. By including coating 81 on the above-described surfaces of crown 54, the increased temperatures resulting from the improved insulation provided by air gaps 74, 76 may be withstood without inducing oxidation.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

The connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus While the embodiments have been described as having exemplary designs, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this invention pertains.

We claim:

1. A piston, comprising:
   a skirt having an upper body portion; and
   a crown formed on the upper body portion by an additive manufacturing process, the crown including an enclosed outer peripheral air gap formed entirely within an outer wall of the crown and an enclosed central air gap.

2. The piston of claim 1, wherein the enclosed outer peripheral air gap and the enclosed central air gap are formed and positioned to reduce heat transfer from combustion to at least one cooling gallery formed in the piston.

3. The piston of claim 2, wherein the cooling gallery is defined by a surface of the crown and a surface of the skirt adjacent a perimeter of the piston.

4. The piston of claim 1, wherein the additive manufacturing process includes laser metal deposition.

5. The piston of claim 1, wherein the crown includes an upper surface, a bowl rim, the outer wall and a central wall, the outer peripheral air gap being disposed between an inner surface of the outer wall and the upper body portion of the skirt, and the central air gap being formed between the central wall and the upper body portion of the skirt.

6. The piston of claim 5, further comprising an anti-oxidation coating applied to at least one of the upper surface of the crown, the bowl rim, the inner surface of the outer wall, and the upper surface of the central wall.

7. The piston of claim 6, wherein the anti-oxidation coating includes at least one of an aluminium chrome oxide coating or a chrome oxynitride coating.

8. The piston of claim 6, wherein the anti-oxidation coating has a thickness of less than 50 micrometers.

9. The piston of claim 6, wherein the anti-oxidation coating has a thickness of between 5 micrometers and 10 micrometers.

10. A method of forming a piston, comprising:
    providing a skirt having an upper body portion; and
    forming a crown on the upper body portion by an additive manufacturing process, the crown including an outer peripheral air gap formed entirely within an outer wall of the crown and positioned to reduce heat transfer from combustion to at least one cooling gallery formed in the piston.

11. The method of claim 10, wherein forming a crown on the upper body portion by an additive manufacturing process includes using a laser metal deposition process.

12. The method of claim 10, wherein the cooling gallery is defined by a surface of the crown and a surface of the skirt adjacent a perimeter of the piston.

13. The method of claim 10, wherein the crown further includes a central air gap.

14. The method of claim 13, wherein forming a crown on the upper body portion by an additive manufacturing process includes forming an upper surface of the crown, a bowl rim of the crown, the outer wall of the crown and a central wall of the crown, the outer peripheral air gap being disposed between an inner surface of the outer wall and the upper body portion of the skirt, and the central air gap being formed between the central wall and the upper body portion of the skirt.

15. The method of claim 14, further comprising applying an anti-oxidation coating to at least one of the upper surface of the crown, the bowl rim, the inner surface of the outer wall, and the upper surface of the central wall.

16. The method of claim 15, wherein the anti-oxidation coating includes at least one of an aluminium chrome oxide coating or a chrome oxynitride coating having a thickness of less than 50 micrometers.

17. A piston prepared by a process, comprising:
providing a skirt having an upper body portion; and
forming a crown on the upper body portion by an additive manufacturing process, the crown including an enclosed outer peripheral air gap formed entirely within an outer wall of the crown and an enclosed central air gap.

18. The piston of claim 17, wherein the crown is formed and positioned to reduce heat transfer from combustion to at least one cooling gallery formed in the piston.

19. The piston of claim 17, wherein forming a crown on the upper body portion by an additive manufacturing process includes forming an upper surface of the crown, a bowl rim of the crown, the outer wall of the crown and a central wall of the crown, the enclosed outer peripheral air gap being disposed between an inner surface of the outer wall and the upper body portion of the skirt, and the enclosed central air gap being formed between the central wall and the upper body portion of the skirt.

* * * * *